United States Patent

Li

[11] Patent Number: 5,865,940
[45] Date of Patent: *Feb. 2, 1999

[54] REVERSIBLE ATTACHMENT USING DIELECTRIC HEATING

[75] Inventor: Chi Li, Orchard Lake, Mich.

[73] Assignee: Ford Global Technologies, Inc., Dearborn, Mich.

[*] Notice: This patent issued on a continued prosecution application filed under 37 CFR 1.53(d), and is subject to the twenty year patent term provisions of 35 U.S.C. 154(a)(2).

[21] Appl. No.: 544,081

[22] Filed: Oct. 17, 1995

Related U.S. Application Data

[62] Division of Ser. No. 632,830, Dec. 24, 1990, abandoned.

[51] Int. Cl.$^6$ .................................................. B32B 35/00
[52] U.S. Cl. ................................. 156/379.6; 156/379.7; 428/349
[58] Field of Search ................................. 428/355, 349; 156/379.6, 379.7

[56] References Cited

U.S. PATENT DOCUMENTS 3,574,031  4/1971  Heller .
4,749,833  6/1988  Novorsky ............................. 219/10.43

Primary Examiner—Jenna Davis
Attorney, Agent, or Firm—Damian Porcari

[57] ABSTRACT

The present invention relates to a method of removably adhering a non-conductive member to a conductive member comprising the steps of placing an electrode on the non-conductive member. The electrode overlies matting surfaces of the conductive and non-conductive members. A reheatable adhesive is applied between matting surfaces of the conductive and non-conductive members and a high frequency electric field is applied between said electrode and said conductive member sufficient to cure the adhesive. The non-conductive member may be removed from the conductive member by applying a high frequency electric field between the electrode and said conductive member sufficient to soften the adhesive and removing the non-conductive member from the conductive member.

1 Claim, 2 Drawing Sheets

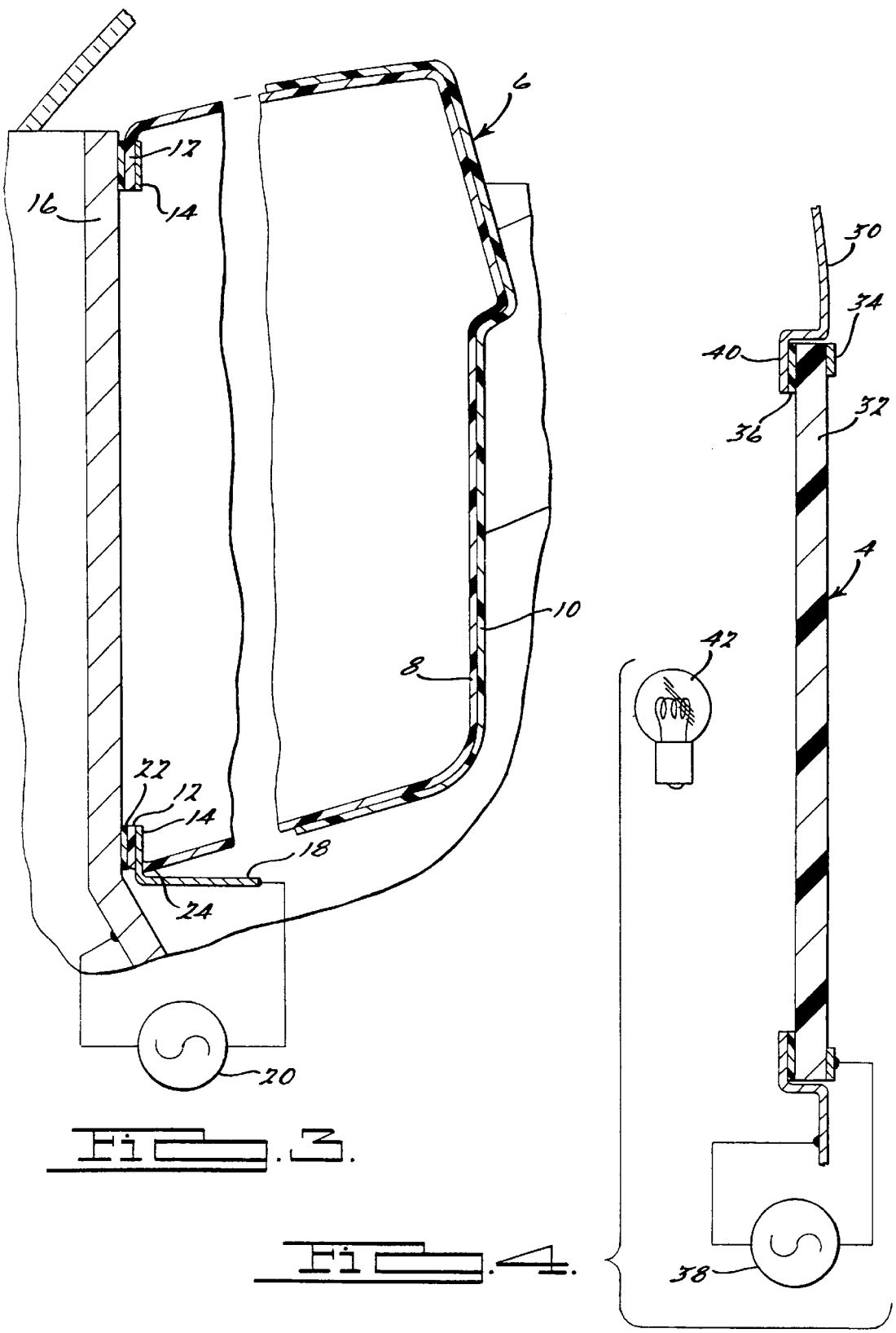

REVERSIBLE ATTACHMENT USING DIELECTRIC HEATING

This is a divisional of application Ser. No. 07/632,830 filed Dec. 24, 1990, now abandoned.

FIELD OF THE INVENTION

The present invention relates to a method and device for removably attaching a member using a dielectrically heated hot-melt adhesive. More specifically, the present invention relates to a method and device for adhering and removing a non-conductive member to a conducting frame by passing a high frequency electric field through the adhesive.

BACKGROUND OF THE INVENTION

Modern hot-melt type thermoplastic adhesives are useful for permanently bonding a wide variety of components. They have excellent thermal and physical properties which makes their use in a manufacturing assembly process highly desirable. Generally, hot-melt adhesives are made from a thermoplastic material which softens when heated. The softened adhesive is very tacky and adheres well to a variety of substrates. As the adhesive cools, it hardens and forms a rigid bond.

The adhesive is generally preheated by special heaters to increase its viscosity from a solid or near solid consistency to a paste or liquid consistency. The softened adhesive is applied between matting surfaces of pieces to be bonded and the adhesive allowed to cool. Once the adhesive cools, the pieces form a permanent assembly. It is very difficult to remove a part from the assembly. The assembly may be reheated to a temperature sufficient to soften the adhesive and thus remove the part, but this may require heating the entire assembly in an oven. The matting surfaces between the parts are often inaccessible to a heat source. It is difficult to apply heat only to the adhesive and not the adjacent parts. If one or more of the adjacent parts are heat sensitive, they may be damaged by the heat necessary to soften the adhesive. Additionally, hot-melt adhesives require special mixing, heating and applying apparatuses to assure the adhesive is at the proper temperature when applied. Hot-melt adhesives are generally not heated after they are applied to the parts. This subsequent heating is known to cure thermosett adhesives.

Thermosett adhesives require additional heat not to soften and become tacky, but to aid in achieving cure. They differ from hot-melt adhesives because they undergo a chemical reaction which cross-links molecules in the adhesive. Once cured, thermosett adhesives cannot be reheated to become soft.

Several common means of heating thermosett adhesives include conduction, convection and radiant heating. Conduction heating is achieved by placing a wire in the adhesive and passing a current through the wire. The current heats the wire which in turn heats the adhesive. Conduction heating has the disadvantage of requiring a conductive wire to be placed in the adhesive bond. The wire is difficult to be properly located within the adhesive and weakens the bond.

Radiant or convection heating is achieved by placing the part to be bonded with adhesive in a radiant or convection oven. The adhesive is heated indirectly by heat passing through the parts to be bonded. Convection or radiant heating requires that both the parts and the adhesive be heated in an oven. Some parts, such as thermoplastics, may weaken or deform when heated to the temperatures necessary to cure the adhesive. Further, radiant and convection heating generally require upwards of twenty minutes to cure the adhesive.

Another method of curing thermosett adhesives by concentrating heat within the adhesive is taught and disclosed in U.S. Pat. No. 4,749,833, issued Jun. 7, 1988 to Novorsky et al. Novorsky et al. teaches induction heating of an adhesive. Spherical particles of steel are placed within the adhesive and moved in rolling contact with one another to establish an accurate space between two members to be bonded in an adhesive joint. The adhesive joint is placed between or adjacent to an induction coil and a current is passed through the coil. The current passing through the coil induces spherical particles to heat thereby heating the surrounding adhesive. As in the method of conduction heating, induction heating also requires the addition of foreign metal particles within the adhesive, thereby decreasing the strength of the bond.

It is known to heat polar materials including thermosett adhesives in a high frequency electric field by a process called dielectric heating. U.S. Pat. No. 3,291,671, issued Dec. 13, 1966 to Hecht, teaches a fusing of plastic films by dielectric heating. A water containing paper board separated by one or more polyethylene films is placed between two electrodes. A radio frequency (RF) generator is attached to the electrodes and passes an electric field through the polyethylene film and water containing paper board. The polyethylene films fuse to one another and to the paper board. This illustrates dielectric heating but not the dielectric heating of an adhesive to achieve curing.

Dielectric heating to cure thermosett adhesives is shown and disclosed in EPO Patents 0,339,494 and 0,339,493, both filed Apr. 20, 1989 and U.S. Ser. No. 07/187,358 filed May 28, 1988. These patents teach the bonding of a fiber-reinforced plastic (FRP) exterior member to a U-shaped FRP reinforcement member. A bead of two-part epoxy resin adhesive is placed between the exterior and reinforcement members. The bonded assembly is then moved to a chamber containing a dielectric heater. The first electrode having roughly the same contour as the outer skin is placed against the outer skin member and a second electrode having a concentrator is placed over the reinforcement member. A high-frequency electrostatic field of between 300 and 8,000 volts is applied through the electrodes. The high frequencies range between 25 and 40 MHz. This apparatus teaches curing times of approximately 30 to 40 seconds. The apparatus uses a plurality of electronically isolated concentrators overlying the exterior member. After the exterior member is bonded to the reinforcement member, the concentrators are removed. The EPO patents relate specifically to thermosett adhesives and require separate electrodes for both parts being bonded. They do not teach the use of an integral electrode, or the use of a conductive frame as an electrode. Additionally, the EPO patents do not teach the heating of hot-melt adhesives or the disassembly of a bonded assembly.

When bonding elongated parts such as instrument panels, it is difficult to access mating surfaces between the elongated part and frame. Commonly, instrument panels are installed before the window glass and access to the frame can be achieved through the window opening. Most instrument panels use mechanical fasteners such as screws or bolts to secure the panel to the frame. The problem with mechanical fasteners is that loosening of the screws causes squeaking and rattling the instrument panel. Bonding the instrument panel directly to the frame alleviates the squeaking and rattling. Conventional bonding with thermosett adhesives makes removal of the instrument panel difficult. Instrument panel removal is believed of much greater concern with the advent of in panel air bags. By teaching the removable bonding of an instrument panel to a frame, the difficulties of mechanically fastening the instrument panel as well as the problems of squeaking and rattling are overcome.

Similar problems occur when mechanically fastening a lens to a lamp assembly. Mechanical fasteners provide a less attractive finished appearance and require additional sealant around the lens perimeter. Conventionally bonded lens cannot be easily removed from the lamp assembly without damaging the fragile lens. By providing a method and device for removal by bonding a lens to a conductive frame, lamp assemblies may be designed for bulb replacement from the exterior of the vehicle. Exterior access for bulb replacement simplifies packaging of the lamp assembly as well as sealing the lens.

It is a primary object of this invention to utilize RF dielectric heating for removably bonding a non-conductive member to a conducting frame. The invention permits the removable bonding of elongated parts such as an instrument panel where it is otherwise difficult to fasten to the frame. An electrode is permanently secured to the non-conductive member and can be used to secure portions which are not otherwise easily accessible. The need for separate electrodes is eliminated by using the conductive frame as one electrode and permanently attaching the other electrode to the bonded part. Nonuniform heating of elongated plates is reduced by pulsing the electric field.

SUMMARY OF THE INVENTION

The present invention relates to a method of removably adhering a non-conductive member to a conductive member comprising the steps of placing an electrode on the non-conductive member. The electrode overlies matting surfaces of the conductive and non-conductive members. A reheatable adhesive is applied between matting surfaces of the conductive and non-conductive members and a high frequency electric field is applied between the electrode and conductive member sufficient to soften the adhesive. The non-conductive member may be removed from the conductive member by applying a high frequency electric field between the electrode and conductive member sufficient to soften the adhesive and removing the non-conductive member from the conductive member.

An RF generator applies a high frequency electric field between the electrode and conductive member. The high frequency electric field heats the adhesive to a temperature sufficient for the hot-melt (thermoplastic type) adhesive to flow. The melted adhesive becomes tacky and fills the gap between the electrode and conductive member. After the electric field is removed, the adhesive cools, hardens and forms an adhesive bond joint. Reapplying the electric field reheats and softens the adhesive allowing the non-conductive member to be removed from the conductive member.

The conductive member is usually a frame or support made of a conductive material such as steel, aluminum, copper, etc. and is used both as a reinforcement member or structure and as an electrode for the dielectric heating of an adhesive. The non-conductive member is a panel or port which is bonded to the frame. Suitable non-conductive materials include glass, ceramics, plastic, rubber and wood. Particularly preferred for automotive applications are the bonding of glass, ceramic and plastic materials to metal.

An electrode having a shape approximately the same as the matting surfaces of the bonded joint is aligned to overlie the matting surfaces and secured to the non-conductive member. The frame and electrode are connected to a radio frequency generator and an electric field is applied to the adhesive. The frame acts as an electrode connected for the radio frequency generator and an electric field passed between the electrode and frame in the vicinity of the joint.

To avoid uneven heating of large surfaces, the radio frequency current applied to the electrodes is pulsed. This pulsing is believed to disperse standing waves in the electrode and reduce uneven heating of the adhesive. This permits the use of long electrodes, i.e. electrodes longer than 1/15th of the wavelength of the electric field.

As an RF generator applies an electric field to an adhesive joint, dielectric heating within the adhesive raises the temperature of adhesive. As the temperature reaches the glass transition temperature, $T_\lambda$, the adhesive viscosity increases. The softened adhesive becomes tacky and adheres to the mating surfaces. When the non-conductive member is also a thermoplastic, the adhesive may actually soften the non-conductive member slightly and weld to the matting surface of the non-conductive member. Dielectric heating continues as long as the electric field is applied. After the electric field is removed, the dielectric heating stops and the adhesive begins to cool. When the adhesive cools below its $T_\lambda$, the viscosity increases and the adhesive solidifies. The invention does not cure the adhesive. There is believed to be no significant cross-linking between molecules within the hot-melt adhesive as it heats or cools.

The invention is particularly useful for attaching elongated items where the attaching face is remote from the finished face such as automotive instrument panels and attaching items without fasteners to locations with no rear access such as lens for lamp assemblies. Permanently securing the electrode to the bonded item eliminates the requirement for a separate electrode for each type of bonded part. This is especially useful in areas were a wide variety of parts are required to be attached and removed through dielectric heating such as a body repair facility. A general purposed RF generator can be attached to the frame and electrode and an electric field applied to dielectrically heat the adhesive.

These and other objects, features and advantages of the present invention are shown in the following description and by reference in the accompanying drawings.

DETAILED DESCRIPTION OF THE DRAWINGS

FIG. 3 shows a detailed sectional view of the instrument panel shown in FIG. 2 connected to an RF generator.

FIG. 4 shows a sectional view taken along the line 4—4 of FIG. 1.

DETAILED DESCRIPTION OF THE PREFERRED EMBODIMENTS

In U.S. Application titled Dielectric Curing of Adhesives, Attorney Docket 90-009, incorporated herein by reference, it is taught the dielectric heating of thermosett adhesives to achieve cure. A non-conductive member was adhered to a conductive frame by placing an electrode over the non-conductive member and attaching the electrode and frame to an RF generator. The radio frequency electric field, electrode type and length are taught in the co-pending application. The present invention uses the RF heating taught in Attorney Docket 90-009 to adhere a non-conductive member having an integral electrode to a conductive frame with a hot-melt type adhesive.

By way of example, the present invention teaches the attachment of a transparent tail lamp lens and instrument panel to an automobile. Shown in FIG. 1, is a rear perspective view of an automobile 2 having a typical rear tail light lamp assembly 4 and instrument panel 6.

Figure 1:
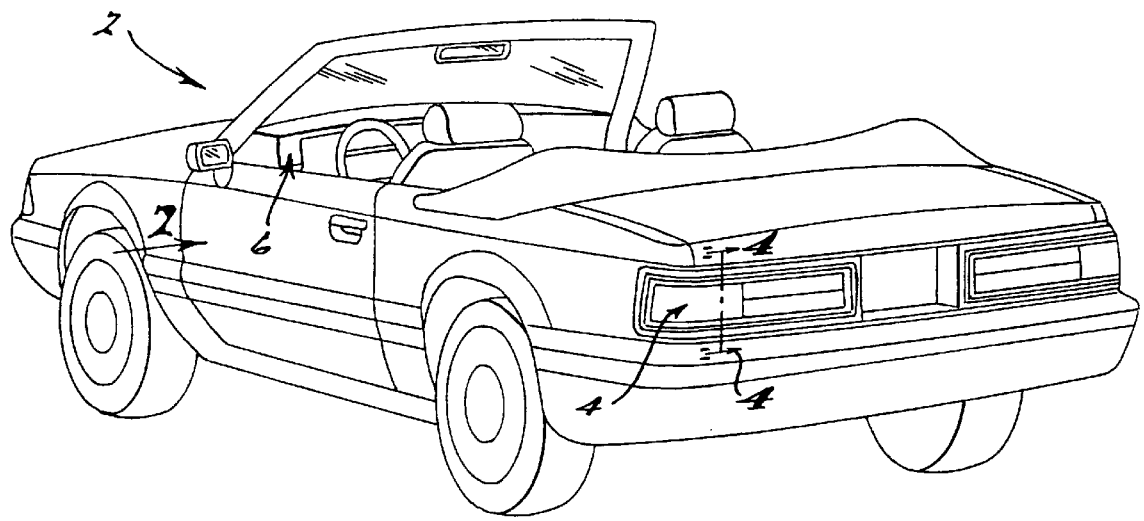
FIG. 1 shows a perspective view of the rear and side portions of an automobile.
Figure 2:
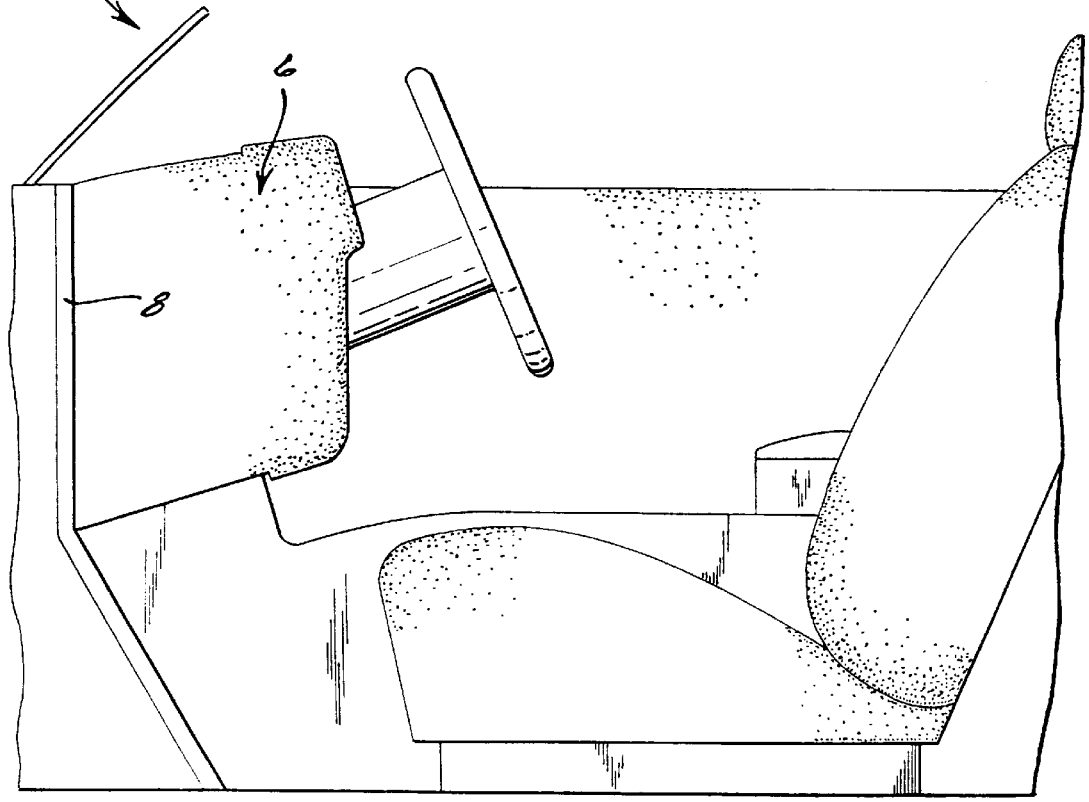
FIG. 2 shows a portion of an outline sectional view taken along the arrow A of FIG. 1.

Shown in FIG. 2 is an outline sectional view of the interior detail of automobile 2 taken along the arrow A in FIG. 1. Instrument panel 6 is secured to firewall 16 of a vehicle. A firewall comprises a stamped sheet metal cross-car beam securely attached to the frame of the automobile.

Shown in FIG. 3 is a detailed sectional view of the instrument panel firewall assembly. Instrument panel 6 comprises a generally hollow housing 10 made of a rigid non-conductive material such as plastic. Common plastics include polypropylene, polycarbonate, nylon, ABS, thermoplastic polyolefin (TPO), polymethyl methacrylate, polysulfone, polyaralate as well as other plastic materials. The interior portion of housing 10 contains instrument dials, ventilation conduits, electrical components and the steering column (all are not shown for the sake of clarity). At least a portion of housing 10 is covered by padded face 8 which presents an attractive finished appearance to the driver and passenger of the vehicle. Firewall 16 separates the interior cabin compartment from the engine compartment. Firewall 16 is made of a conductive material, generally steel and is secured to the frame of automobile 2 by welding. Firewall 16 is electrically conductive with the frame of the vehicle and is commonly used as a ground for electrical components.

The interior of housing 10 comprises an in-turned lip 12. Lip 12 extends around the perimeter of housing 10. Continuity of lip 12 is not necessary for this invention. The length of lip 12 is sufficient to provide a secure attachment means for housing 10 to firewall 16. Secured to the interior surface of lip 12 is continuous electrode 14. Electrode 14 overlies the mating surfaces of lip 12 and firewall 16. Continuity of electrode 14 is not necessary for this invention. Electrode 14 may be made of any suitable conductive metal or foil secured to or within lip 12. Suitable metals and foils include aluminum, copper, steel, zinc and nickel.

One or more leads 18 extend from electrode 14 and connect all portions of electrode 14 to one terminal of RF generator 20. Lead 18 may be an extension of electrode 14 or may be made of a different conductive material. Lead 18 passes through aperture 24 in housing 10 and extends the connection of electrode 14 to an easily accessible location on the bottom portion of instrument panel 6.

The invention permits the use of hot-melt adhesives without preheating the adhesive before it is applied to a bonded assembly. A bead of reheatable hot-melt adhesive is applied to attaching face 13 of lip 12. Adhesive 22 may be preheated sufficiently to secure adhesive 22 to face 13 and then allowed to cool. Alternatively, adhesive 22 may be applied without preheating and mechanically attached to face 13 by insertion into a groove or seat. Physically attaching adhesive 22 to face 13 eliminates the need for separate hot-melt heater, mixers or applicators.

Hot-melt adhesive 22 may be made of any number of suitable adhesives which may be dielectrically heated and reheated. Suitable adhesives include filled thermoplastic hot-melts such as adhesive vinyls, ethylene-co-vinyl acetate, thermoplastic polymethane and polyesters. Of these suitable adhesives, particularly preferred are commercially available adhesive HM2657, manufactured by H. B. Fuller Company, Willow Lake, Minn.

Instrument panel 6 is urged onto firewall 16. If adhesive 22 is still warm or normally in paste form, it will uniformly spread between the mating surfaces of lip 12 and firewall 16. This spreading is not necessary for the invention and may otherwise result where the adhesive is subjected to dielectric heating. RF generator 20 is capable of operating between the frequencies of 10 MHz and 100 MHz. RF generator 20 is attached between firewall 16 and lead 18. Because firewall 16 is electrically connected to the frame of the vehicle, RF generator 20 may be attached to any portion of the frame. An electric frequency of approximately 27 MHz is applied between electrode 14 and firewall 16.

This electric field excites the polar and ionic species within adhesive 22 thereby causing a rise in temperature of the adhesive. This rise in temperature softens adhesive 22 and causes it to fuse to firewall 16 and face 13. Dielectric heating primarily occurs within the adhesive layer. The members adjacent the adhesive warm due to the conduction of heat from the adhesive. The temperature necessary to fuse the hot-melt adhesive should be chosen to be at least 20° C. below the heat deflection temperature of the thermoplastic used for housing 8 and lip 12 if their softening is not desired. If welding adhesive 22 to face 13 is desired, the RF heating is applied until the $T_g$ of face 13 is achieved. The thermoconductivity of firewall 16 may act to remove heat generated within adhesive 22. If cooling is desired, firewall 16 is made relatively thick and left uncoated. If thermal conductivity of firewall 16 is not desired, (for example to speed dielectric heating) than firewall 16 may be treated with an epoxy electro-coat or other insulating layer.

An electric field of approximately 5000 volts and 5 amps is applied between electrode 14 and firewall 16 for about 20 seconds. This is believed sufficient to soften hot-melt adhesive 22 and secure instrument panel 6 to firewall 16.

When applying the methods taught by this invention to bond a large instrument panel to a metal frame, the electrode will tend to have a length greater than 1/15th of the heating wavelength of the alternating electric field. EPO patents 0,339,493 and 0,339,494, both incorporated herein by reference, describe uneven heating resulting from the use of a single elongated electrode. The EPO patents overcame this uneven heating by using a plurality of closely spaced electrodes. The use of closely spaced electrodes increases the cost and complexity of a dielectric heater and causes uneven heating of the adhesive in the space between adjacent electrodes. In co-pending application Attorney Docket 90-009, a pulsed or switched electric field is applied between the electrode and conductive frame to avoid uneven heating.

After adhesive 22 has cooled sufficiently to secure instrument panel 6 to firewall 16, RF generator 20 is disconnected from lead 18 and firewall 16. Adhesive 22 remains susceptible to dielectric heating because it has not undergone a chemical reaction as would a thermosett adhesive. Instrument panel 6 may be removed from firewall 16 by reheating adhesive 22.

To remove instrument panel 6, RF generator 20 is attached to lead 18 and connected to firewall 16. An electric field is applied between electrode 14 and firewall 16 to dielectrically heat adhesive 22 to a temperature sufficient to soften the adhesive. Once adhesive 22 is softened, instrument panel 6 may be easily removed from firewall 16. Instrument panel 6 may be reattached using the same or fresh adhesive as described above.

Shown in FIG. 4 is a sectional view of a tail light lamp assembly taken along the line 4—4 of FIG. 1. Automobile 2 comprises conductive metal body panel 30 having lamp assembly 4 therein. Specifically shown is a rear tail lamp assembly but other lamp assemblies for turn signal, marker, cornering or head lamps are also included within the scope of this invention. An in-turned perimeter portion 40 defines an aperture in body panel 30 through which light source 42 illuminates lens 32. Perimeter portion 40 generally extends along the entire perimeter of lamp assembly 4. Light source 42, generally a bulb placed within a parabolic reflector, illuminates the interior portion of lamp assembly 4. Lens 32 is made from a transparent non-conductive colored material. Suitable materials include glass, acrylic, polycarbonate and polymethylmethacrylate. Secured to the outer perimeter of lens 32 is electrode 34. Electrode 34 overlies the mating surfaces between perimeter portion 40 and lens 32. Electrode 34 can be made of any suitable metal or foil including aluminum, copper, zinc, nickel and steel. When low currents of 5 amps are used, the thickness of electrode 34 can be as thin as 0.2 mm, however, thicker electrodes will also work well with this embodiment.

Electrode 34 is intended to be visible and should present a finished appearance. This finished appearance may be further enhanced by plating with chrome or painting. Electrode 34 may be mechanically secured to lens 32 or secured with an adhesive which is generally not subject to dielectric heating.

A bead of dielectrically heatable hot-melt type adhesive 36 is placed between mating surfaces of lens 32 and perimeter portion 40. Lens 32 is urged onto body panel 30 to evenly distribute adhesive 36 between mating surfaces of lens 32 and perimeter portion 40. RF generator 38 is connected between electrode 34 and body panel 30. An electric field is applied between electrode 34 and body panel 30 to dielectrically heat adhesive 36 to secure lens 32 to body 30. Lens 32 may be removed from body 30 by attaching generator 38 between electrode 34 and body panel 30 and applying an electric field to dielectrically heat and soften adhesive 36.

This invention enables the removal of fragile lens 32 from and automobile body without damaging the lens. By providing access to light source 42 from the exterior of body 30, interior access to the light source may be eliminated. Eliminating the need for interior access to light source 42 greatly simplifies the location and fabrication of lamp assembly 4.

By securing electrode 34 directly to lens 30, the only additional piece of equipment necessary to bond or remove the lens is a general purpose RF generator. A single multi-purpose RF generator may be used to bond or remove a wide variety of components.

The invention has been described in terms of bonding a plastic type panel to a metal frame. However, other types of non-conductive materials such as glass, wood, ceramic and rubber components may be removably bonded to a conductive frame using the methods taught herein. Also, the invention has been described by permanently securing an electrode to a non-conductive member. The electrode can be simply overlaid the non-conductive member in those locations where the bond joint is easily accessible or situations where a separate electrode is desirable.

While certain representative embodiments and details have been shown for purposes of illustrating the invention, it will be apparent to those skilled in the art that various changes in the methods and apparatuses described herein may be made without departing from the scope of the invention, which is defined by the appended claims.

I claim:

1. A conductive and non-conductive assembly comprising;

a frame made from an electrically conductive material acting as an electrode for an RF electric field, said frame having a matting surface;

a member made from an electrically non-conductive material, said member having a matting surface for attachment to said frame matting surface and a surface opposite and overlying said member matting surface;

an electrode permanently secured to said opposite surface of said member, said electrode overlying said frame and member matting surfaces and a dielectrically heatable adhesive between said frame and member matting surfaces, said adhesive completely occupying the space between said frame and member matting surfaces and being directly heatable by an RF field generated by an RF generator attached between said frame and said electrode, said RF field causing said adhesive to dielectrically heat and soften to removably secure said member to said frame.

* * * * *